United States Patent
Nagano et al.

(10) Patent No.: US 6,308,687 B1
(45) Date of Patent: Oct. 30, 2001

(54) CONTROL APPARATUS FOR MULTI-CYLINDER INTERNAL COMBUSTION ENGINE

(75) Inventors: Masami Nagano; Seiji Asano, both of Hitachinaka; Mamoru Nemoto, Hitachiohta, all of (JP)

(73) Assignees: Hitachi, Ltd., Tokyo; Hitachi Car Engineering Co., Ltd., Hitachinaka, both of (JP)

( * ) Notice: Subject to any disclaimer, the term of this patent is extended or adjusted under 35 U.S.C. 154(b) by 0 days.

(21) Appl. No.: 09/583,576

(22) Filed: May 31, 2000

(30) Foreign Application Priority Data

Jun. 2, 1999 (JP) .................................................. 11-154638

(51) Int. Cl.$^7$ .................................................. F02M 51/00
(52) U.S. Cl. .......................................... 123/478; 123/531
(58) Field of Search ..................... 123/478, 531, 123/533

(56) References Cited

U.S. PATENT DOCUMENTS

| | | | | |
|---|---|---|---|---|
| 6,158,420 | * | 12/2000 | Ohsaki et al. | 123/531 |
| 6,167,863 | * | 1/2001 | Kazama et al. | 123/478 |
| 6,182,636 | * | 2/2001 | Russell et al. | 123/478 |
| 6,199,537 | * | 3/2001 | Kowatari et al. | 123/478 |
| 6,223,728 | * | 5/2001 | Hosokawa et al. | 123/478 |

* cited by examiner

Primary Examiner—John Kwon
(74) Attorney, Agent, or Firm—Crowell & Moring LLP

(57) ABSTRACT

There is disclosed a fuel supply control apparatus for a multi-cylinder internal combustion engine having an injector with air assist, a reasonable system in which injection is made during intake stroke when air assist air is supplied by the air assist, and injection is made during exhaust stroke when no air assist is effected, and an air assist volume, a droplet size and an operating condition are combined. With this construction, the fuel injection timing is shifted from the intake stroke side to the exhaust stroke side in accordance with an air assist volume so as to enhance the exhaust gas quality in which optimum micro-granulation and atomization of fuel are held, the fuel efficiency and the drivability.

5 Claims, 15 Drawing Sheets

▨ FUEL INJECTION TIMING
↯ IGNITION TIMING

CONTROL APPARATUS FOR MULTI-CYLINDER INTERNAL COMBUSTION ENGINE

BACKGROUND OF THE INVENTION

The present invention relates to a fuel supply device for an internal combustion engine incorporating a plurality of cylinders, in particular, a multi-cylinder internal combustion engine in which fuel is fed under control of a fuel injection valve provided to each of cylinders, and also relates to a control apparatus which carries out the control.

Conventionally, there has been known, as a fuel supply system in a fuel supply device in a multi-cylinder internal combustion engine, the so-called sequential fuel injection control system in which fuel is supplied while fuel injection valves incorporated respectively to cylinders are sequentially controlled in synchronization with rotation. In this sequential fuel injection control as is discussed on, for example, page 1004 in "Automobile Technology" Vol, 39, No. 9, 1985, control of beginning of blowing, that is, the initiation of injection is controlled, and control of completion of blowing, that is, the completion of fuel injection is controlled, are carried out. In this control system, the fuel injection volume and the fuel injection timing are determined in view of an engine load which is in turn determined in accordance with an intake-air volume, an engine rotational speed and the like in any one of these controls, and the above-mentioned fuel injection timing is normally carried out during exhaust stroke of each of cylinders, except upon transient caused by an abrupt variation in load.

Namely, in the above-mentioned conventional method, as indicated by a timing chart shown in FIG. 12 of the accompanying drawings, fuel injection for each of the cylinders in the internal combustion engine is carried out such that an injection volume of fuel to be fed into each of the cylinders of the engine is at first obtained through correction on the basis of Qa/N, that is a quotient between an intake air volume Qa and a rotational speed N of the engine, that is, an engine load, with the use of various coefficient factors, and the above-mentioned injection timing as indicated by hatched lines in the timing chart, is carried out during exhaust stroke of each of the cylinder in consideration with a fuel injection period determined correspondingly to the above-mentioned fuel injection volume.

However, in the above-mentioned conventional technology, since there has not yet been built up a reasonable system in such a case that a plurality of main factors such as a droplet size of a fuel injection device having air-assist, an operating condition, an optimum fuel injection timing caused by a degree of air-assist and the like are combined with one another, there have caused problems such that THC components in exhaust gas cannot be reduced, and that the fuel efficiency and the drivability cannot be enhanced.

SUMMARY OF THE INVENTION

The present invention systemizes the above-mentioned elemental technologies so as to build up a system in order to improve components of exhaust gas, and accordingly, an object of the present invention is to provide a fuel supply system and a control apparatus for a multi-cylinder internal combustion engine, which can aim at enhancing the fuel efficiency and the drivability of the engine.

The above-mentioned object can be achieved by a fuel supply control apparatus for a multi-cylinder internal combustion engine comprising a means for shifting the fuel injection timing of a fuel injection device having air assist (which will be hereinbelow referred to "injector incorporating air-assist"), from intake stroke to exhaust stroke in accordance with a degree of air assist.

BRIEF DESCRIPTION OF THE DRAWINGS

FIG. 1 is a view illustrating injection timing according to the present invention;

FIG. 2 is a view illustrating injection timing according to the present invention;

FIG. 3 is a view illustrating injection timing according to the present invention;

DESCRIPTION OF THE PREFERRED EMBODIMENTS OF THE INVENTION

Before embodiments of the present invention are explained, explanation will be first made of results of experiments upon which the present invention is based.

Figure 10:
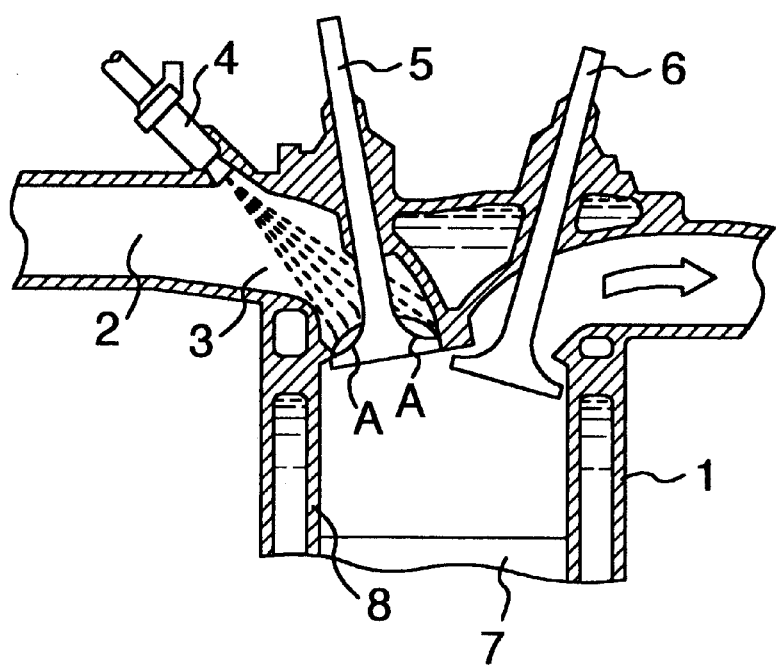
FIG. 10 is a view illustrating fuel injection during exhaust stroke by an air-assist injector without air assist.

In general, the supply of fuel in a multi-cylinder internal combustion engine, as shown in FIG. 10, is carried out in such a way that fuel is injected from a fuel injection valve 4 mounted in the vicinity of a suction port 3, for each of cylinders, of an intake air pipe 2 of an engine 1, onto a bevel part of the front end part of an intake valve 5 which is incorporated in the upper part of each of the cylinders so as to be vertically slidable. At this time, the engine 1 carries out exhaust stroke so that an exhaust valve 6 is opened while a piston 7 is on the way of ascent.

During the above-mentioned exhaust stroke, the fuel injected from the above-mentioned fuel injection valve 4 sticks to the inner wall surface of the intake air pipe 2 and the periphery of the above-mentioned intake valve 5, still remaining in the form of liquid, as show in a part A in FIG. 10. However, the parts to which the fuel sticks is hot so that the fuel catches up heat therefrom so as to be evaporated.

Next, when the engine 1 starts carrying out intake stroke, the exhaust valve 6 is closed while the intake valve 5 which has been closed descends so as to be opened. Accordingly, air having a volume which corresponds to a throttle opening degree flows through an air-cleaner and the like which are not shown, and into a cylinder 8 of the engine 1. At this time, fuel which is evaporated and a part of fuel which has stuck and stagnated is fed into the cylinder 8 of the engine 1.

If the fuel is fed in a condition in which the droplet size thereof is large, the burning condition is deteriorated so that the fuel efficiency, the drivability and the emission are deteriorated.

Accordingly, the fuel injection is carried out during exhaust stoke.

Figure 9:
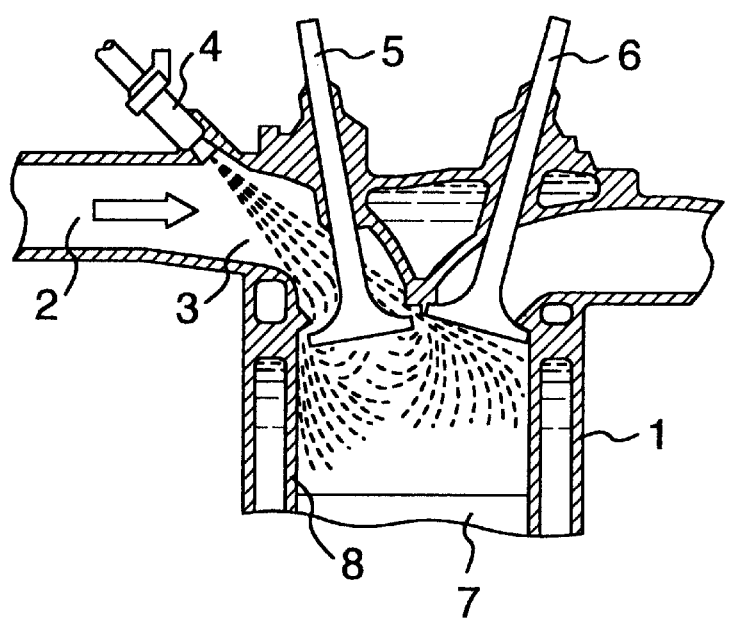
FIG. 9 is a view illustrating fuel injection during intake stroke by an air-assist injector with air assist.

Meanwhile, FIG. 9 shows such a condition that the droplet of fuel is contrarily decreased through the air-assist, and then the fuel is injected when the engine 1 carries out its intake stroke. In this case, as clearly shown in the figure, the fuel injected from the fuel injection valve 4 is mingled in intake air, being atomized, and is then introduced into the cylinder 8 of the engine 1.

No evaporation is required since the droplet size of the fuel is fine. Further, the fuel is prevented from being unevenly distributed in the cylinder 8 caused by sticking of the fuel, thereby it is possible to greatly improve the creation of a fuel-air mixture.

Figure 13:
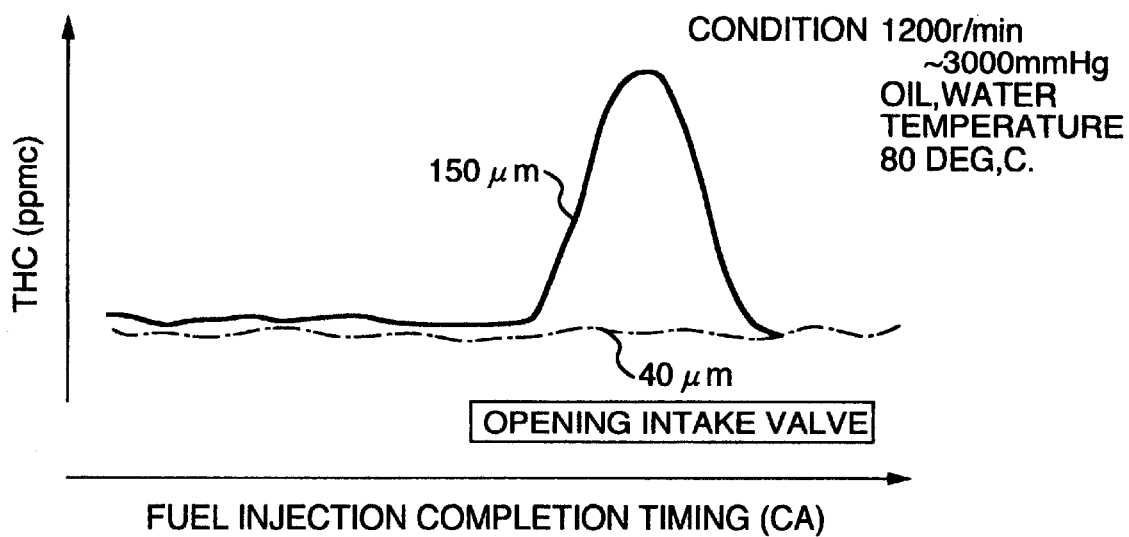
FIG. 13 is a view illustrating relationship between injection timing and exhaust gas.

FIG. 13 shows an exhaust characteristic. Exhaust constituents such as nitrogen oxides (NOx) and total carbide (THC) including carbon monoxide (CO) or hydrocarbon (HC), that is, components (indicated by the ordinate in a graph shown in the figure) in exhaust gas, are greatly affected by the fuel injection timing. For example, in a normal engine operating range, if the timing of completion of fuel injection is carried out in an intake zone, the THC components in exhaust gas are increased so as to deteriorate the burning condition, and accordingly, the output power of the engine is lowered. The reason of this case is considered to be such that if fuel having a large droplet size is injected during intake stroke of the engine, ignition is made in such a condition that the fuel is not sufficiently evaporated and mixed in the cylinder. If fuel having a small droplet size is injected, the THC is lowered as a whole, as indicated by a one-dot chain line, and it is understood that it is not affected by the injection timing. It is noted that the crank angle (CA), that is, the angle of a crankshaft for exhibiting the fuel injection timing is taken on the abscissa of the graph in the figure.

Figure 14:
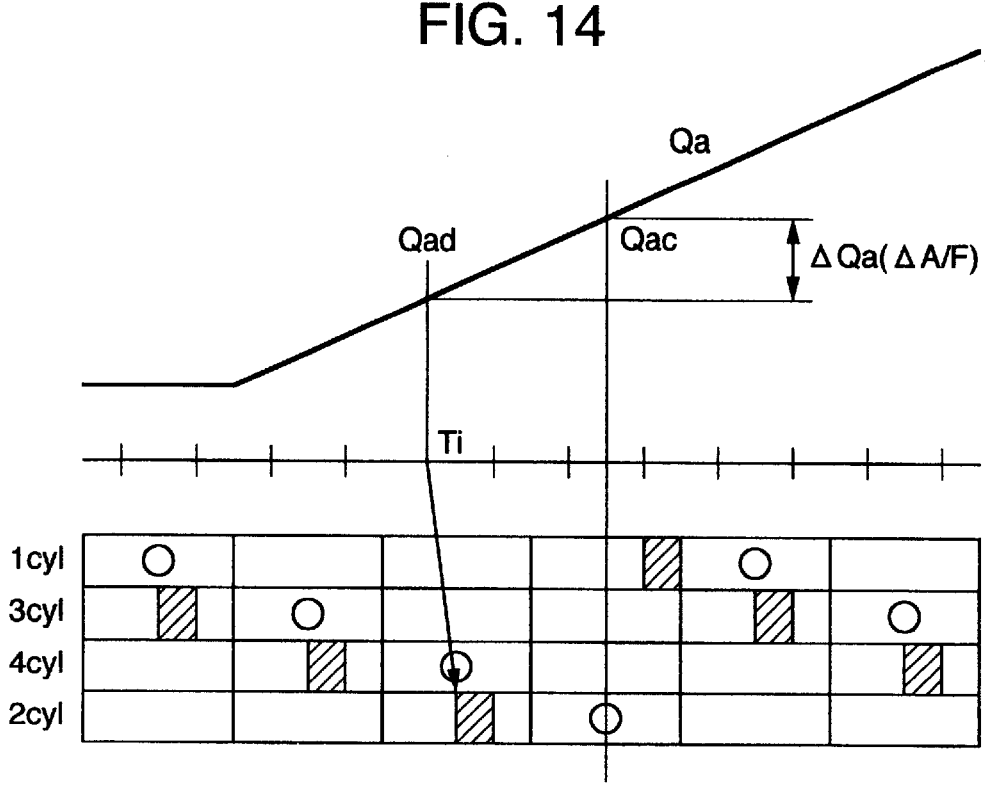
FIG. 14 is a view illustrating relationship between injection timing and variation in A/F.
Figure 16:
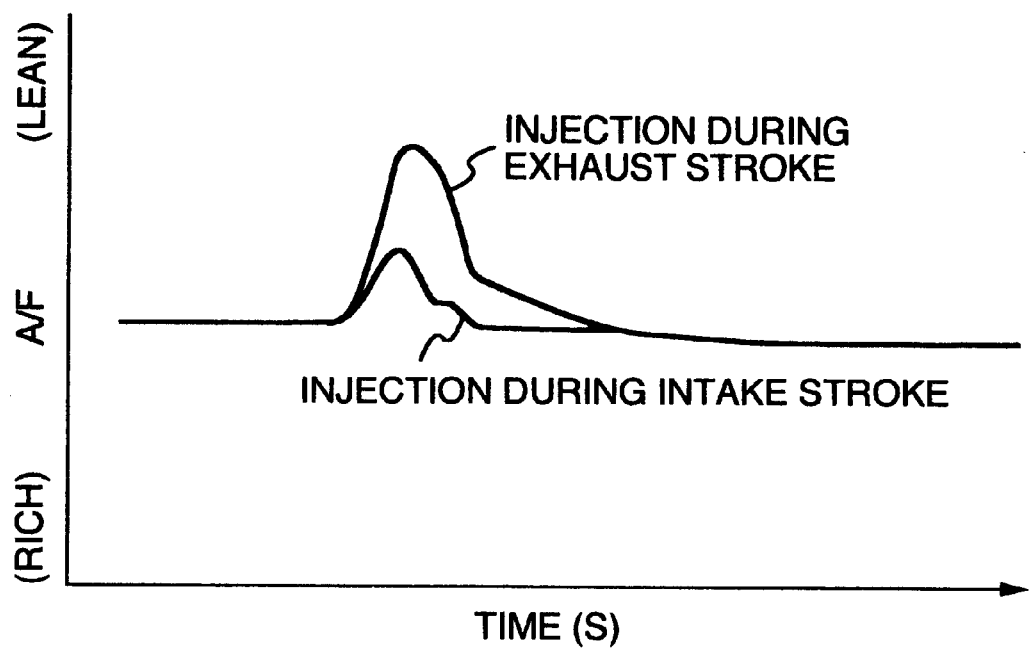
FIG. 16 is a view illustrating injection timing and behavior of A/F during transient.

FIG. 14 and FIG. 16 show the fuel injection timing and A/F behaviors upon acceleration. FIG. 14 shows such a case that the fuel injection timing is carried out during exhaust stroke. Engine parameters are processed by a task with 10 ms. A fuel injection pulse width Ti for injection into two cylinders is calculated from Qad. However, since a flow rate of air actually introduced is Qac, ΔQa is obtained as shown in the figure, which causes variation in A/F.

Figure 15:
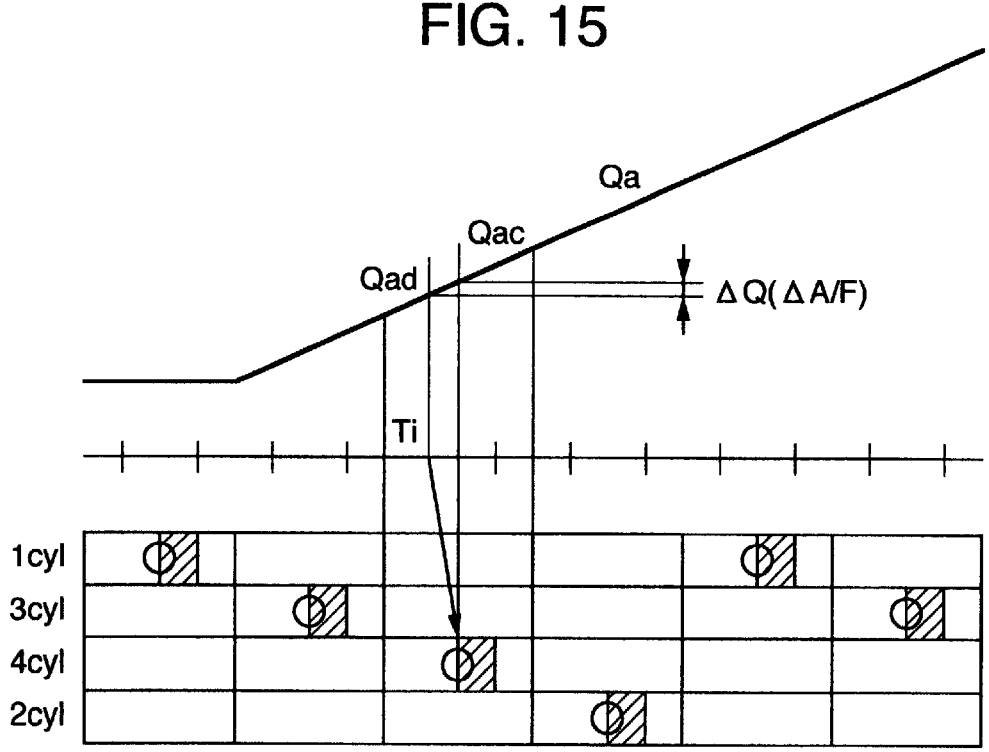
FIG. 15 is a view illustrating relationship between injection timing and variation in A/F.

Meanwhile, if the fuel is injected during intake stroke, as shown in FIG. 15, the difference ΔQa between the Qad from which the fuel injection pulse width Ti is calculated, and the Qac which is actually introduced is small, and accordingly, variation in A/F becomes smaller.

FIG. 16 shows results of proof experiments, that is, it shows a behavior of A/F when the throttle valve is abruptly opened while the speed of the engine is maintained to be constant. It is understood that the width of variation in A/F is small through the injection during intake stroke in comparison with that through the injection during exhaust stroke.

Next, explanation will be explained the fuel supply control apparatus for a multi-cylinder internal combustion engine, according to the present invention, with reference to the drawings.

Figure 4:
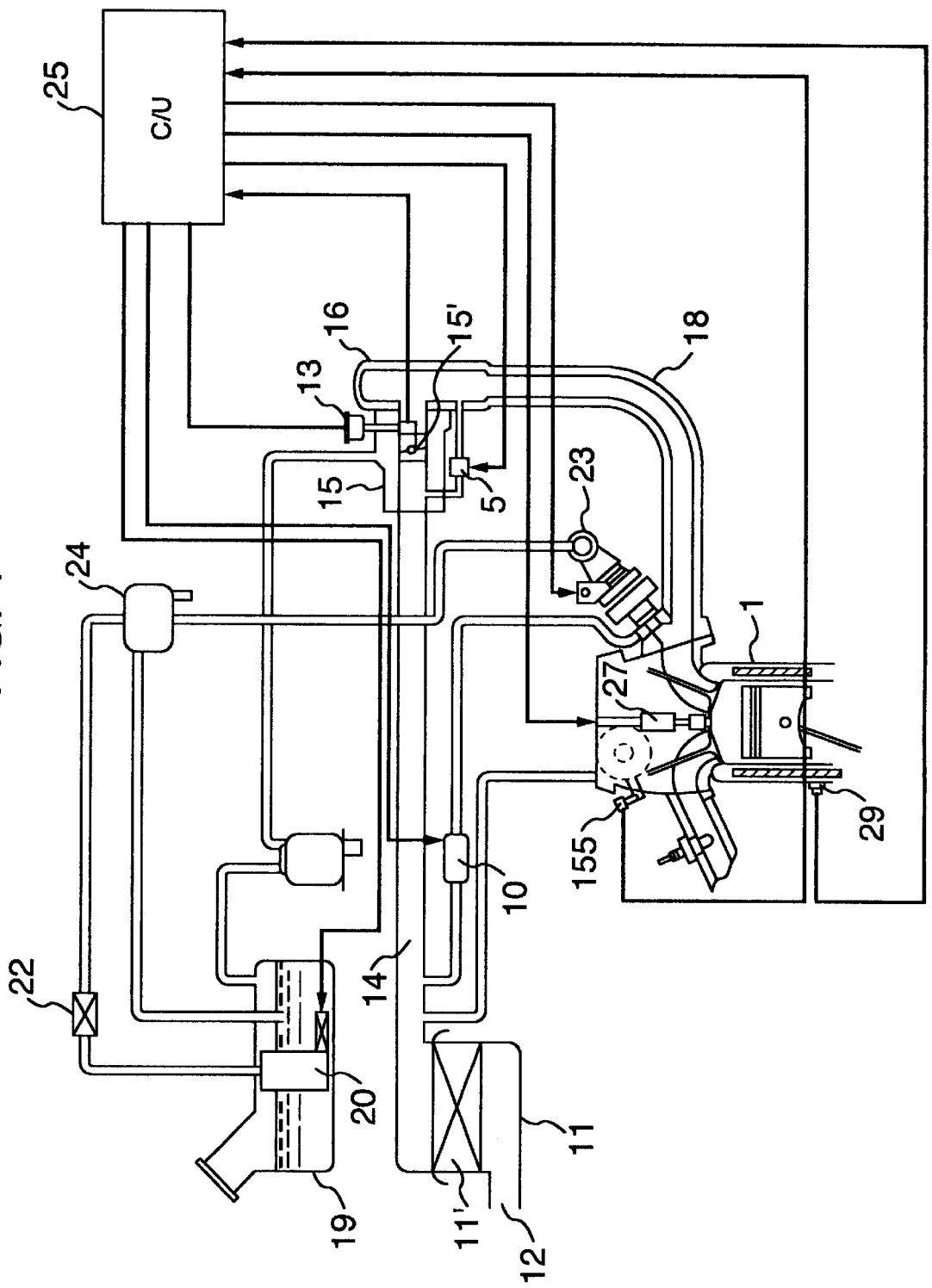
FIG. 4 is a system block diagram of a fuel injection device in which the present invention is applied.

At first, the apparatus will be explained in its entirety. Referring to FIG. 4, air introduced from an inlet part 12 of an air-cleaner 11, passes through a filter 11' in the air-cleaner 11, and thereafter, it flows into the so-called collector 16 through a duct 14 arranged downstream thereof, and a throttle body 15 including a throttle valve 15' for controlling the intake air volume. In this collector 16, the sucked air is distributed among intake air pipes 18 connected respectively to cylinders in the multi-cylinder engine, and is then introduced into the cylinders.

Meanwhile, fuel is sucked from a fuel tank 19 and is then pressurized by a fuel pump 20, and thereafter it is led into a fuel inlet port of a fuel injection valve 23 through a fuel filter 22. Further, a part of the fuel led into the fuel injection valve 22 through the fuel filter, is led into a fuel regulator 24, and is then returned into the fuel tank 19. The operation of the fuel regulator allows the pressure of the pressurized fuel fed into the injection valve to be adjusted to a constant value, and is then injected into the above-mentioned intake air pipe 18 from the injection valve 23.

Figure 17:
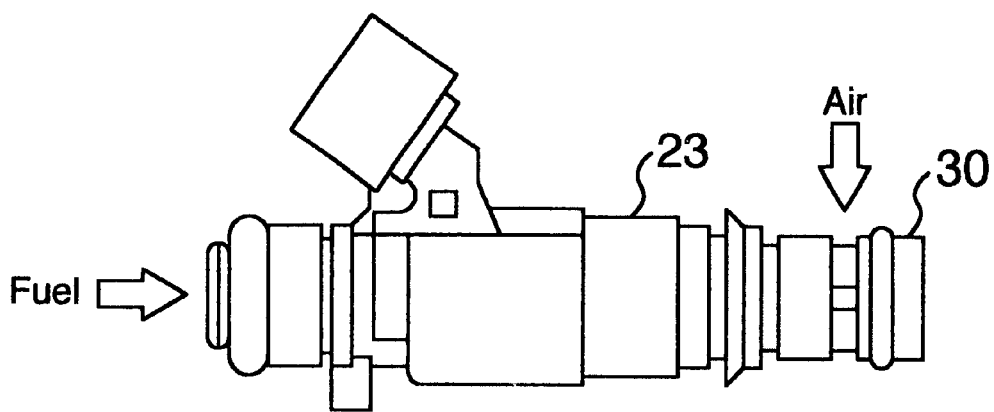
FIG. 17 is a view illustrating the external appearance of an air assist injector.
Figure 18:
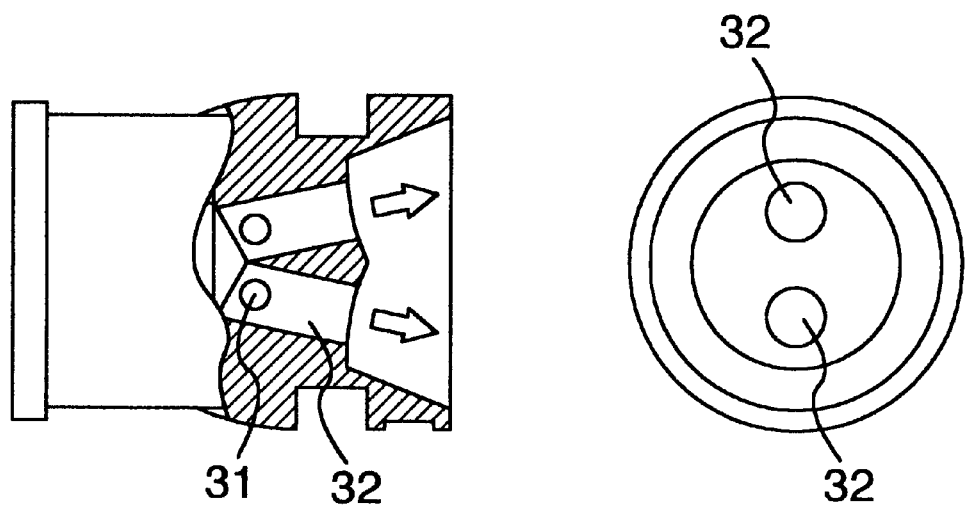
FIG. 18 is a view illustrating a nozzle shape.
Figure 19:
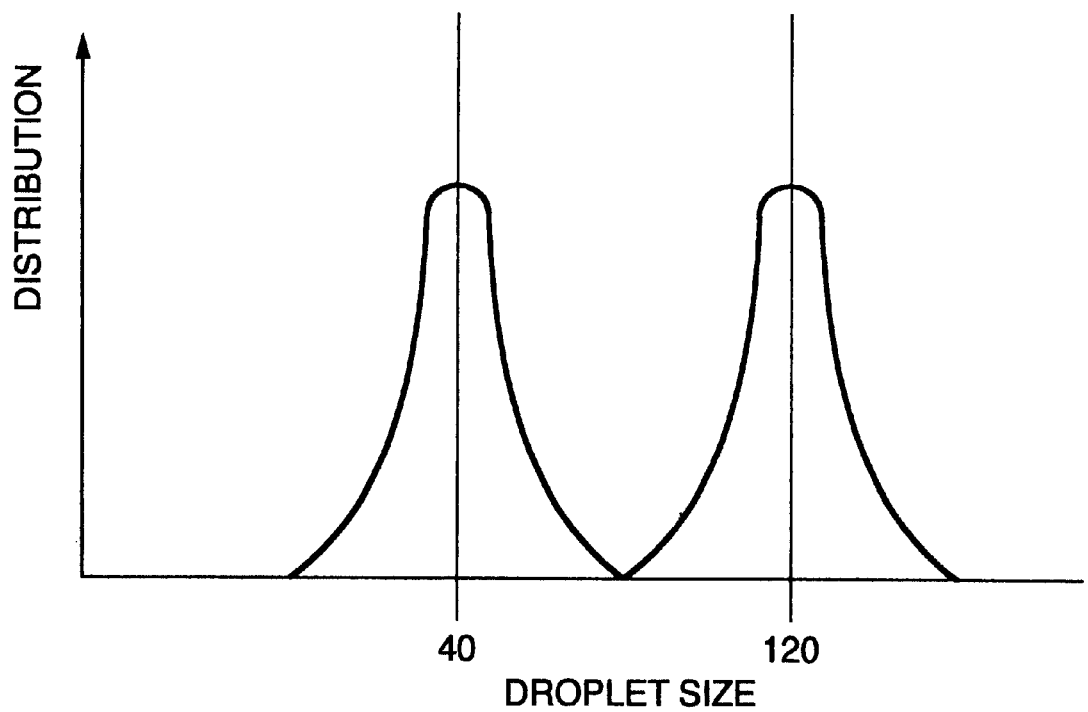
FIG. 19 is a view illustrating droplet size of atomization.

FIG. 17 is an external view illustrating an injector 23 incorporating air-assist, used in this system, FIG. 18 is a detailed view illustrating a nozzle body 30 part, and FIG. 19 is a view which shows droplet sizes with and without air-assist. Referring to FIG. 18, air for air-assist is introduced into an intake air port 31 so as to atomize the fuel coming leftward the a nozzle body 30, and then, the fuel is injected into the nozzle 32. As shown in FIG. 19, the droplet size is about 120 μm in the case of no air-assist, but is about 40 μm in the case of the presence of air-assist. Accordingly, the droplet size varies from 120 to 40 μm in accordance with an air assist air volume.

In this embodiment, as clearly understood from the figures, the fuel injection valve 23 is attached in the vicinity of the intake port of the cylinder, that is, it is attached to the wall surface of the above-mentioned intake air pipe 18. Each of the cylinders of the multi-cylinder internal combustion engine is attached thereto with the fuel injection valve, and accordingly, the fuel injection volume is controlled for each of the cylinders. That is, the so-called MPI (multi-point injection) is constituted.

Further, in the figures, reference numeral 26 denotes a temperature sensor for detecting a temperature of cooling water in the engine.

Further explanation will be made of this embodiment, an electric signal indicating an air flow rate obtained from a pressure sensor 13 for detecting an air flow rate, is delivered into a control unit 25 which will be hereinbelow explained in detail. The above-mentioned throttle body 15 is attached thereto with the so-called throttle sensor 26 for detecting an opening degree of the throttle valve, and an output signal from this throttle sensor 16 is also delivered to the control unit 25. The control unit 25 delivers signals to an ISC valve 5 for controlling the idle speed, a valve 10 for controlling the air volume for air-assist.

Further, a crank angle sensor 155 for detecting a crank rotating angle of the engine is provided. This crank angle sensor in which a metal disc 71 attached to a crank shaft 71 of the engine 1 is formed therein with small holes at predetermined angular intervals, and a light emitting element 73 and a light receiving element 74 are arranged above and below this disc, delivers an output signal in proportion to an rotating angle of the crank shaft 70.

Figures 1, 2, 3:
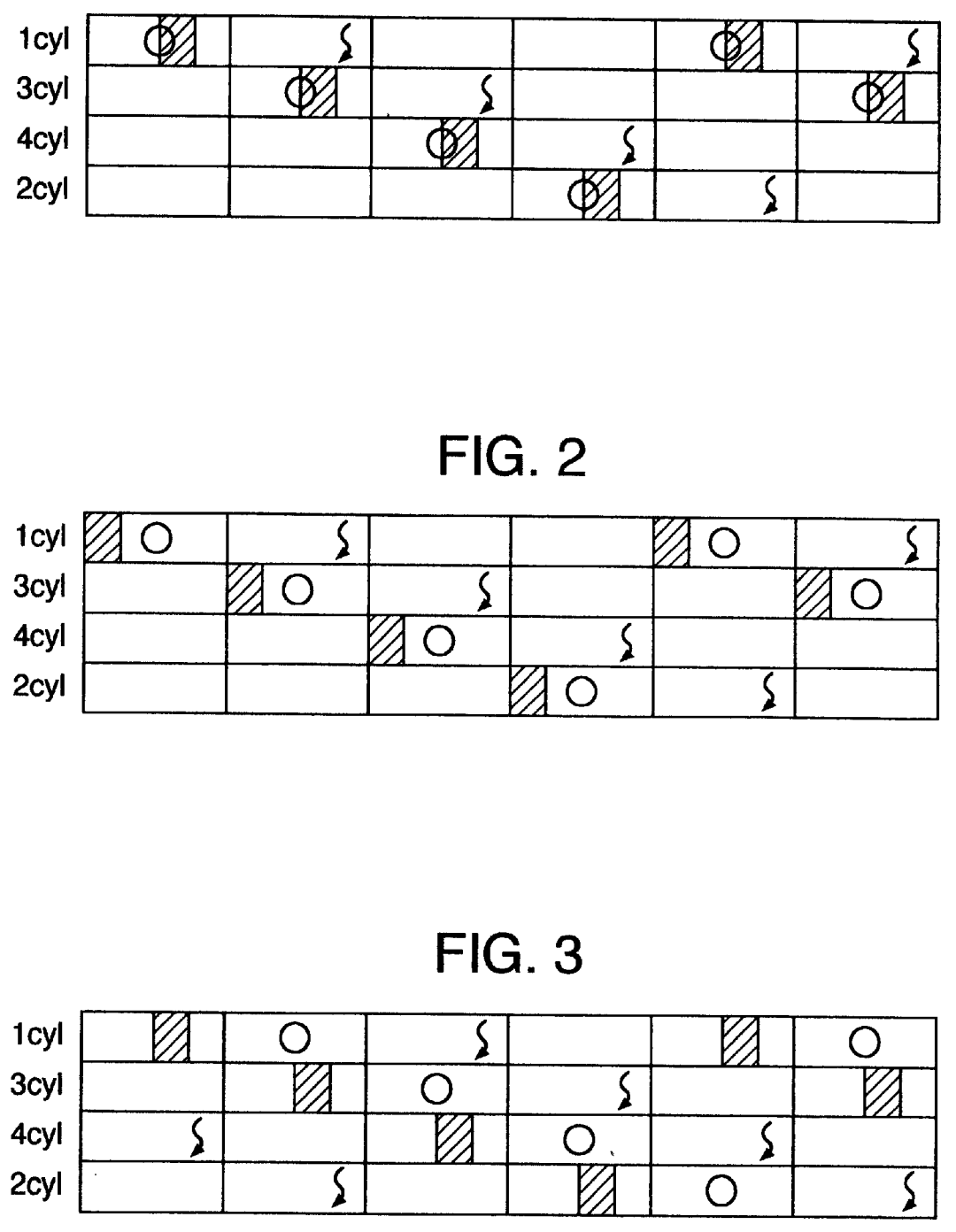

Further, in addition to the small holes 72, the metal disc 71 in the crank angle sensor is also formed therein with a hole having a diameter larger than that of the small holes at a position corresponding to a predetermined angle of the crank shaft, and accordingly, there is arranged such that a reference position signal indicating a reference position thereof is also delivered together with the signal indicating the above-mentioned rotating angle. These output signals are also delivered to the above-mentioned control unit 25. Further, for example, an oxygen sensor for detecting a density of oxygen in exhaust gas is also provided although it is not positively indicated with a reference numeral. The above-mentioned control unit 25 receives signals delivered from the above-mentioned various sensors and indicating an engine operating condition, then carries out predetermined computation in order to drive various actuators in order to perform control optimum for the engine operating condition. For example, as shown in FIG. 2, the above-mentioned control unit 25 controls, in accordance with control signals as outputs therefrom, the operation of a power transistor attached to a side surface of an ignition coil 27 and adapted to perform conduction and cut-off for controlling the supply of high ignition voltage to each of the cylinder, the operation of the above-mentioned fuel injection valve 23 for injecting and supplying fuel into the associated one of the cylinders, and the operation of the above-mentioned fuel pump 20.

Figure 5:
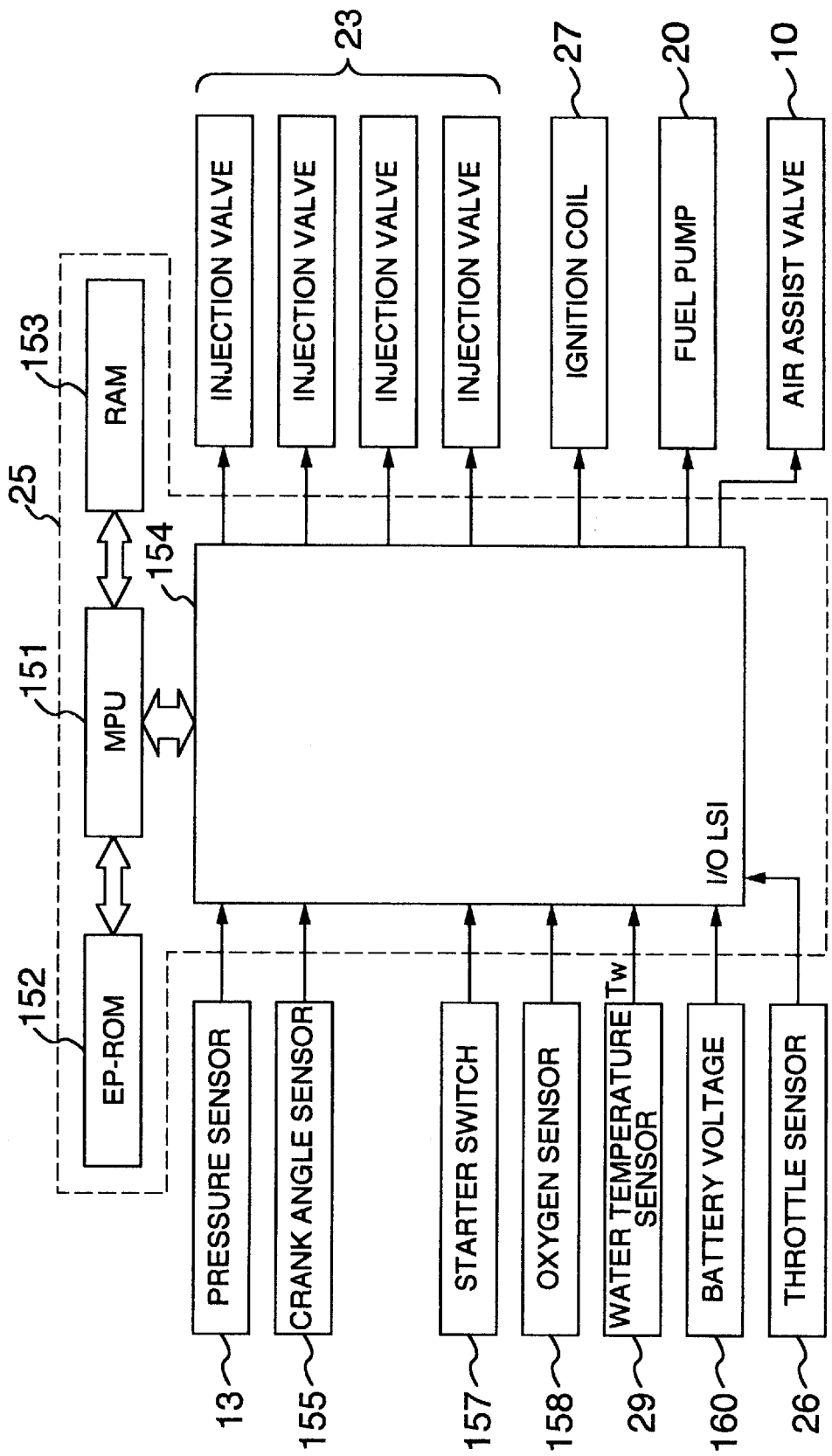
FIG. 5 is a view illustrating an embodiment of a first controller.
Figure 6:
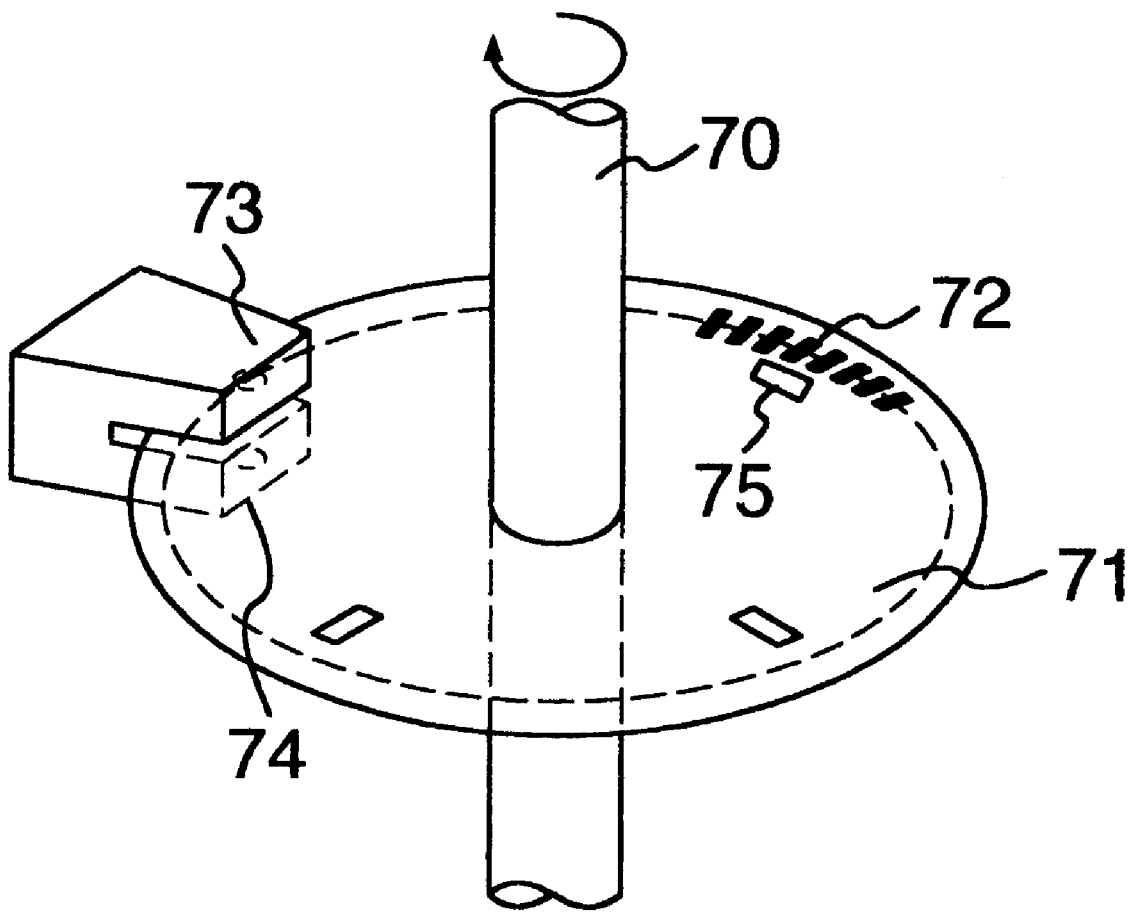
FIG. 6 is a view illustrating an embodiment of a crank angle sensor.

Next, the above-mentioned control unit 25, as shown in FIG. 5 of the accompanying drawings, is composed of a multiplexer unit (MPU) 151, an erasable nonvolatile memory (EP-ROM) 152, a random access memory (RAM) 153, an LSI control component which is an I/O circuit receiving signals detected by the various sensors and indicating a detected engine operating condition of the engine and delivering control signals for driving various actuators, that is, an I/OLSI 154 and the like. Specifically, the I/OLSI 154 receives output signals from the pressure sensor 13, the crank angle sensor 155, a starter switch 157, the oxygen sensor 158, the water temperature sensor 29, a battery voltage sensor 160 and the throttle sensor 26 through an A–D converter incorporated in the I/OLSI or an external A–D converter, as necessary. Thereafter, predetermined computation is made by the above-mentioned PUM 151 and EP-ROM 152 and the RAM 153 so as to control the operations of engine control actuators, that is, the fuel injection valve 23, the power transistors in the ignition coil 27, the fuel pump 20 and the air-assist valve 10.

Figure 7:
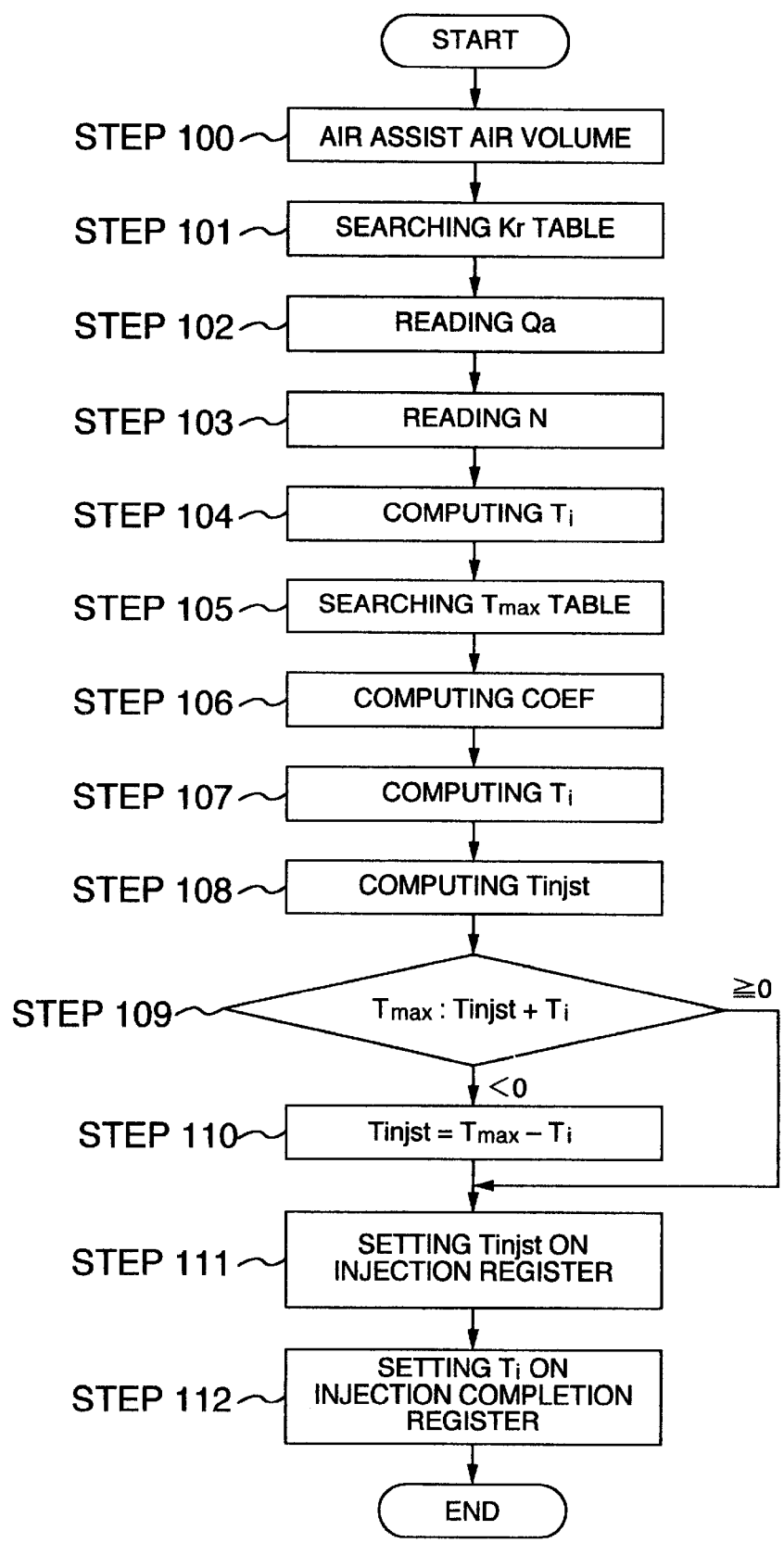
FIG. 7 is a view illustrating a flowchart according to the present invention.
Figure 11:
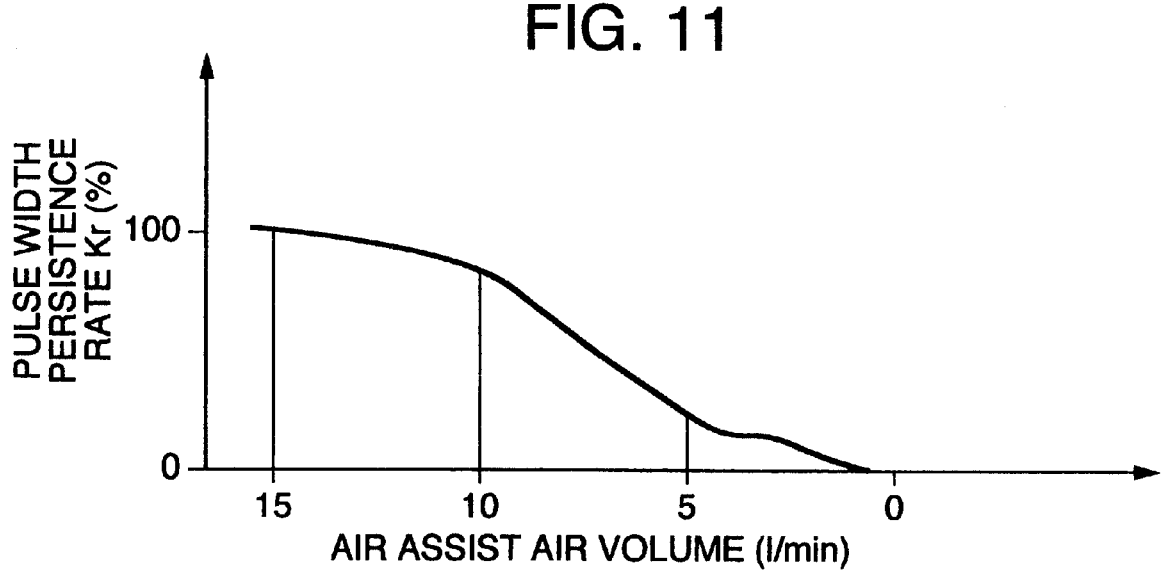
FIG. 11 is a view illustrating pulse width persistence rate Kr.
Figure 12:
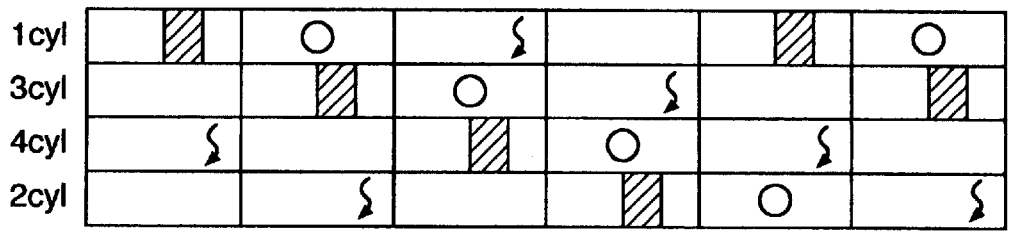
FIG. 12 is a view illustrating conventional injection timing.
Figure 20:
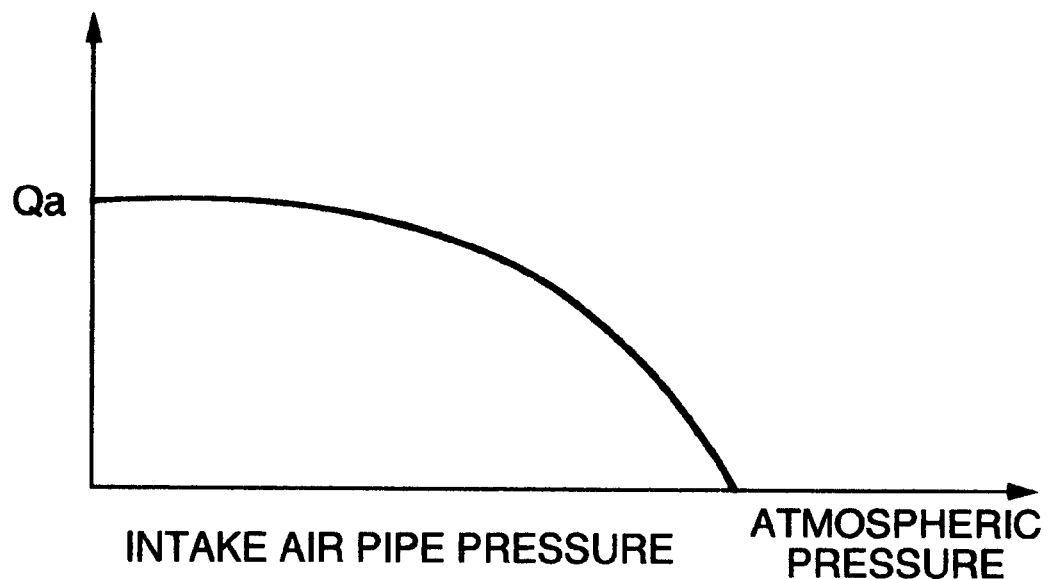
FIG. 20 is a view illustrating pressure in intake air pipe and air assist air volume.
Figure 21:
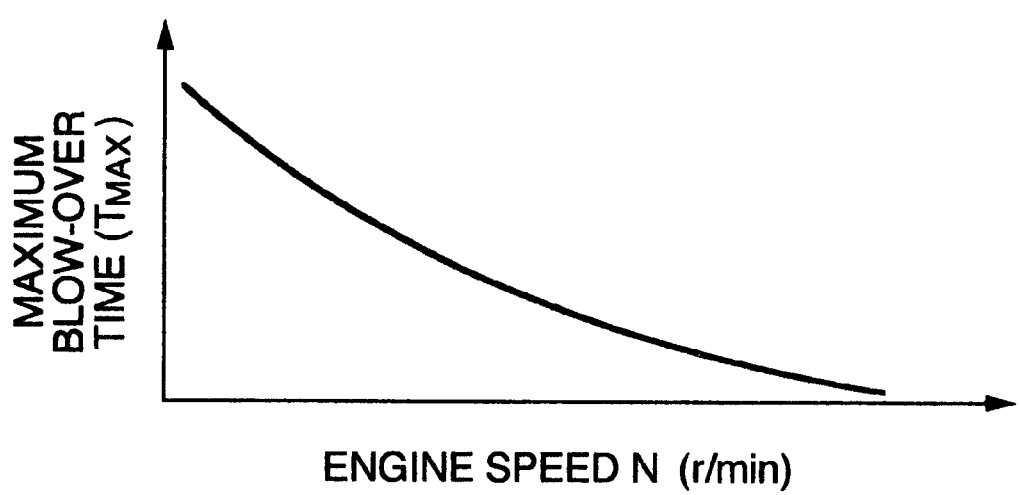
FIG. 21 is a view illustrating relationship between engine speed and maximum blow-over time.

Detailed explanation will be hereinbelow made of the operation of the above-mentioned control apparatus. At first, referring to a flowchart in FIG. 7, at step 100, an air-assist volume obtained from a pressure in the intake air pipe as shown in FIG. 20 is taken into, and at step 101, a table storing therein pulse width persistence rates Kr with which a how many percent of a fuel injection pulse width Ti is shifted into intake stroke is determined, is searched for a persistence rate in accordance with the air assist air volume. FIG. 11 shows an example of data stored in the table. That is, setting is made such that the pulse width persistence rate Kr becomes large (for example, 100% around 15 l/min) as the air assist air volume is large, but the air assist volume is decreased, for example, 85% around 10 l/min and 25% around 5 l/min. Next, at step 102, an intake air volume Qa is taken into in view of an output signal from the pressure sensor 13, and at step 103, an engine speed N is obtained from the above-mentioned output signal. Thereafter, at step 104, with the use of N obtained as mentioned above, times Ti of four strokes (that is, intake, compression, explosion and exhaust) of the engine is obtained, and then, as step 105, with the use of the obtained N, a maximum injection completion time Tmax is obtained. The thus obtained maximum injection completion time Tmax indicates a limitation to the position of completion of fuel injection, and a purpose thereof is to prevent occurrence of intake residue of fuel due to a response lag. For example, as shown in FIG. 21, in view of the engine speed N, Tmax becomes large when N is small (that is, at a low speed), but Tmax becomes small when N is large (that is, at a high speed). These relationships have been previously stored in memory in the form of numerically converted data. Specifically, a Tmax is searched for with the use of an N as a parameter.

At step 106, a mixture ratio correction coefficient COEF is computed from various parameters indicating an engine operating condition (that is, an engine cooling water temperature, an output from the oxygen sensor and the like), and further, at step 107, a fine fuel injection pulse width Ti is obtained with the use of the following formula;

$$Ti = K \times (Qa/N) \times COEF + TS \qquad (1)$$

where Ti is a fuel injection pulse width, k is a correction coefficient, Qa is an intake air volume, N is an engine speed, and COEF is a mixture ratio correction coefficient, and TS is a disable pulse with.

Next, at step 108, a timing Tinjst of initiation of fuel injection is computed from Ti obtained as mentioned above with the use of the following formula;

$$Tinjst = (3/4)Ti - (1-Kr)Ti \qquad (2)$$

Further, at step 109, the position of completion of fuel injection is controlled. That is, if Tmax≧Tinst +Ti, step 111 is soon carried, but if Tmax<Tinjst+Ti, at step 110, the Tinjst is corrected with the use of the following formula;

$$Tinjst = Tmax - Ti$$

At step 111, the fuel injection initiation timing Tinjt after the above-mentioned fuel injection completion position is limited is set on a register. This register starts increment from zero when a reference signal indicating a reference point (for example, a bottom dead center (BDC) lagging from a reference signal for each of the cylinders by an angle of 110 deg.) serving as a reference for the fuel injection control for each of the cylinders, is inputted, and delivers an output signal when it is coincident with the above-mentioned set data.

This output signal is fed into the fuel injection valve 23 as a fuel signal. Further, at step 112, Ti obtained at step 107 is set on a fuel injection completion register. This fuel injection completion register is connected to the above-mentioned fuel injection initiation register, having a following function: and accordingly, when an injection signal is delivered from the fuel injection initiation register, increment of its count value is started from zero. When the increment value (data) and a value (data) set on the fuel injection completion register are coincident with each other, the injection signal delivered to the fuel injection valve 23 is stopped.

Figure 8:
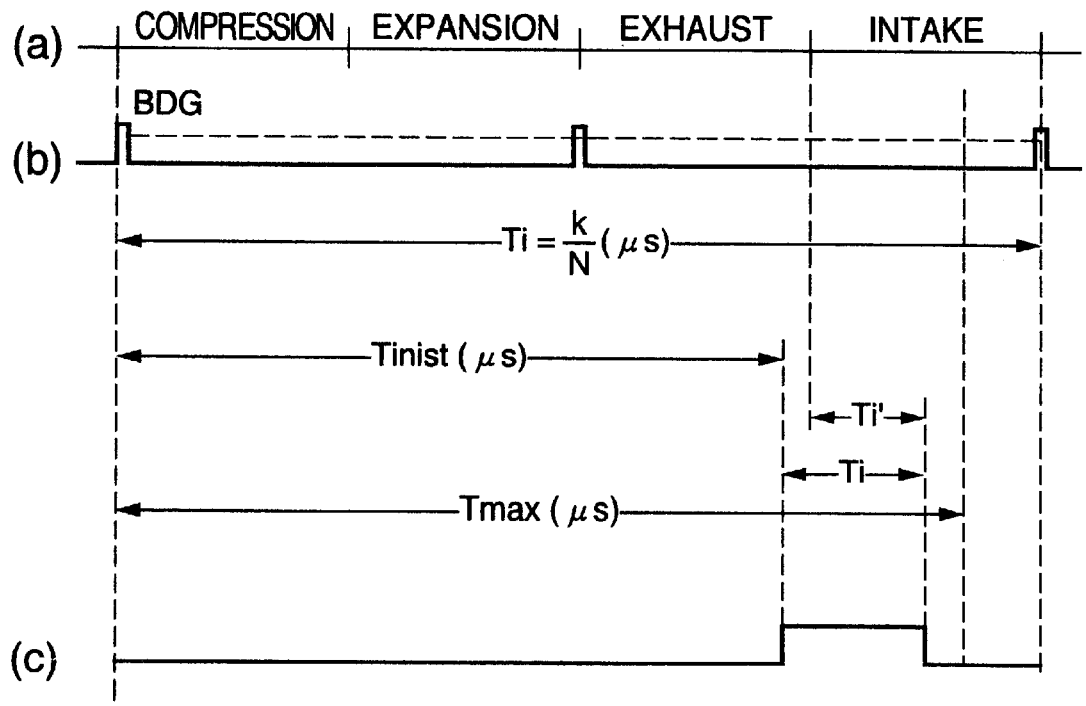
FIG. 8 is a view illustrating a timing chart according to the present invention.

Next, explanation will be made of the content of the control which is carried out through the above-mentioned flow, that is, the process of production of the fuel injection signal for controlling the opening and closing of the fuel injection valve with reference to FIG. 8. First, referring to FIG. 8(a) shows a stroke condition of the engine, four kinds of strokes, that is, compression, expansion, exhaust and intake are successively shown. Further, FIG. 8(b) shows an angle signal (for example, every one deg.) is from the above-mentioned crank angle sensor, and the following control is carried out with reference to the bottom dead center (BDC), that is, the position which lags by an angle of 110 deg. from the reference signal for each cylinder, although it is not shown in the figure.

First, Ti computed at step 104 in FIG. 5, indicates the time of the above-mentioned four strokes, and is obtained from the following formula;

$$Tr = K/N \qquad (4)$$

where K is a constant.

Further, the fuel injection pulse width Ti computed at step 107 indicates a pulse width of a fuel injection signal shown in FIG. 8(c), and Ti' is indicates a part of the fuel injection pulse width Ti, which overlaps with the intake stroke. Further, the relationship between the pulse width persistence rate Kr which is detected at step 101, and the above-mentioned Ti, Ti' is exhibited by the following formula, in which it is noted that the pulse signal is not completely found in the exhaust stroke but it exists completely in the intake stroke if this value Kr exceeds 100%;

$$Kr = Ti'/Ti \qquad (5)$$

Further, in the above-mentioned formula, the fuel injection initiation timing Tinjst exhibits a time from the above-mentioned reference point (BDC), and this time Tinjst can be exhibited as 3/4Ti. Thus, the following formula can be obtained;

$$3/4TI + Ti' = Tinjst + Ti \qquad (6)$$

In this formula, by substituting Ti'=Kr*Ti obtained from the formula (5), the above-mentioned Tinjst can be exhibited as follows;

$$Tinjst = 3/4Ti - (1-Kr)Ti \qquad (7)$$

As clearly understood From this formula, the fuel injection initiation timing Tinjst can be easily obtained from the fuel injection pulse width Ti and the pulse width persistence rate Kr.

Further, as manifest from this figure, Tmax which is the limitation to the fuel injection completion position, is to limit the trailing end (that is, Tinjst+Ti) of the fuel injection pulse width Ti in the above-mentioned FIG. 8(C). It noted that a turn-on condition does never occur after this Tmax.

The supply of fuel under the above-mentioned control, is as shown in FIGS. 1, 2 and 4. A block attached thereto with O mark in these figures, exhibit that it is on the intake stroke, and hatched line parts exhibit the fuel injection timing (incidentally, the arrow mark exhibits the ignition). Further, this block is then advanced into the compression, the expansion and the exhaust successively from the intake. That is, if the air assist air volume becomes equal to a predetermined value (for example, 15 l/min), the fuel injection valve for supplying fuel into the associated one of the cylinders injects a fuel during the intake stroke of the associated cylinder. Thereafter, as the air assist air volume is decreased due to an operating condition, for example, when the air assist air volume is 5 l/min, the injection timing of the fuel injection valve gradually shifts from the intake stroke side into the exhaust stroke side.

Further, when the air assist air volume becomes zero 1/min, the above-mentioned pulse persistence rate Kr becomes zero %, and accordingly, as shown FIG. 3, the injection timing of the fuel injection valve has shifted completely into the exhaust stroke side, that is, the injection timing of the fuel injection valve is returned to a fuel injection timing during normal operation.

In the above-mentioned embodiment, although it has been explained that the injection timing of the above-mentioned valve continuously varies, corresponding to variation in the air assist volume, the present invention should not be limited to this matter, but for example, the air assist volume is divided into a plurality of zones, and the injection timing can be changed stepwise in accordance with each of the zones of the assist volume.

Figure 22:
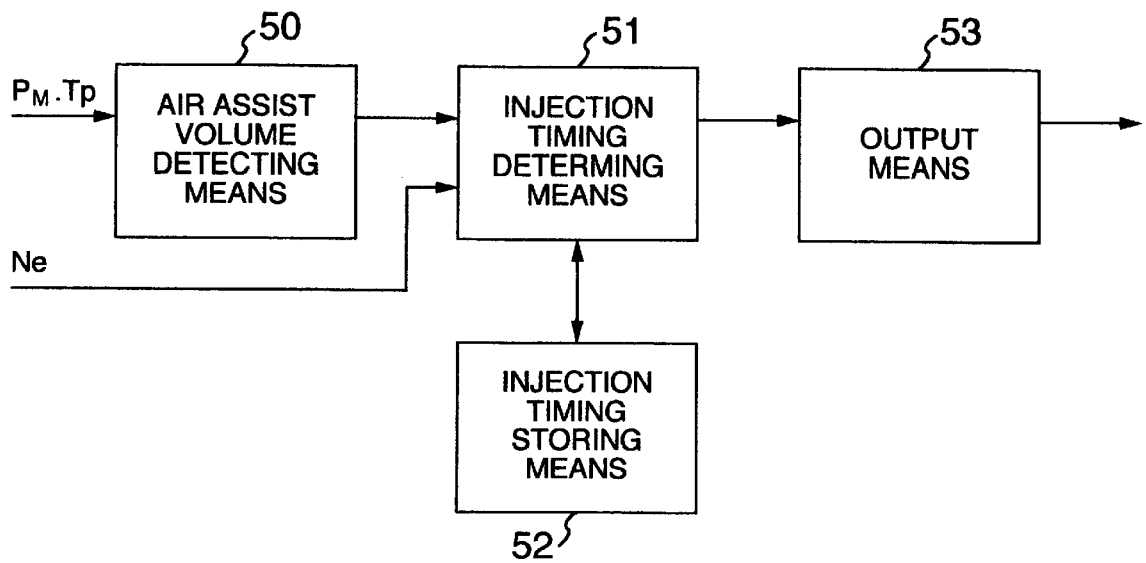
FIG. 22 is a block diagram illustrating another embodiment.
Figure 23:
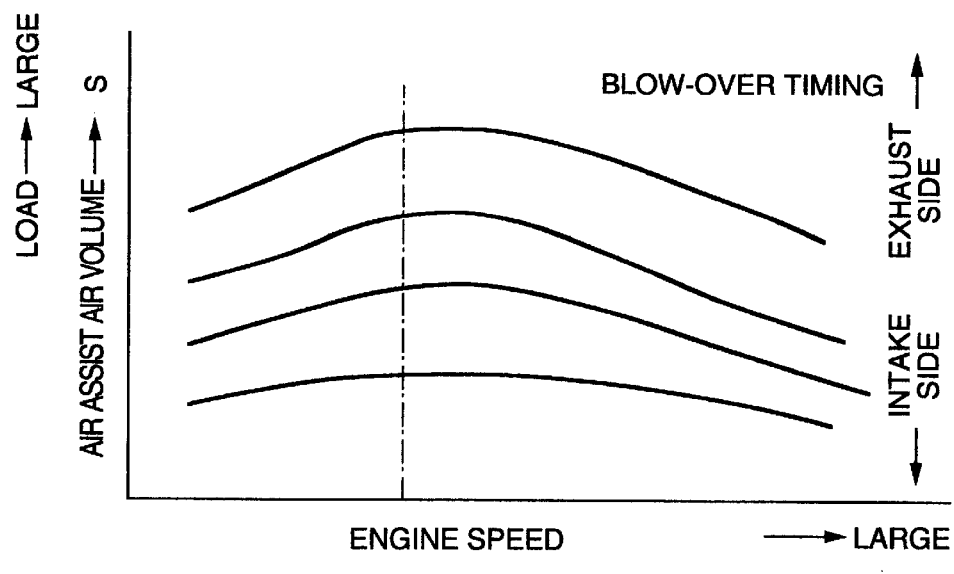
FIG. 23 is a view illustrating blow-over timing.
Figure 24:
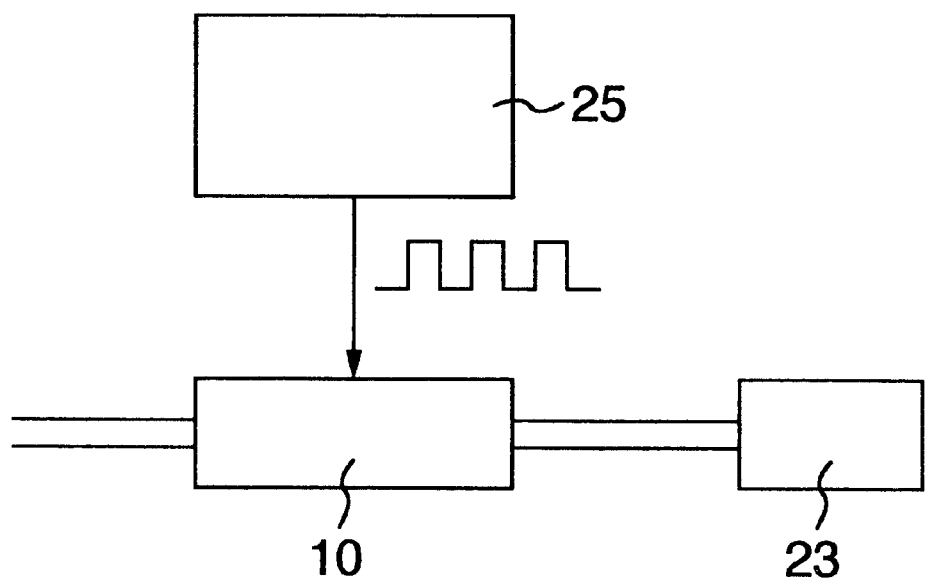
FIG. 24 is a view illustrating a part for controlling air assist volume.
Figure 25:
FIG. 25 is a view illustrating duty and opening area of an air assist control valve.

Next, explanation will be made of another embodiment with reference to FIG. 22, using the blow-over control which has been used in general these days. An air assist volume detecting means 50 detects an air assist volume. This detection can be obtained from either or the combination of an intake air pipe pressure (PM) of an internal combustion engine, a load value, an intake air volume, a throttle opening degree and the like. Further, A load value can be used as a TP which can be obtained from the intake air volume/ rotational speed. An injection timing determining means 51 determines an injection timing from the blow-over map shown in FIG. 23 in accordance with the air assist air volume obtained as mentioned above, and a rotational speed. An output means 53 delivers the fuel injection timing determined by the injection timing determining means to a predetermined address. FIG. 24 is a view illustrating an extraction of a part for controlling the air assist, and in order to precisely control the air assist volume, it is required to carry out duty control of the valve 10. It is noted that reference numeral 23 denotes a fuel injection valve. FIG. 25 shows the relationship between the duty and the area of this valve 10. The air assist volume can be calculated from the above-mentioned area and a pressure in the intake air pipe.

Although the air assist volume can be obtained from the intake air pressure, it goes without saying that the accuracy can be further enhanced by involving a duty value for the valve 10.

According to the present invention, if the air assist air is supplied by using an injector with air assist, fuel is injected during intake stroke so that the fuel is supplied into the engine, being carried on an air stream, and the fuel injection pulse wide is calculated with the use of newest data in order to supply the fuel.

When the air assist is effective, the injection is carried out during intake stroke, but as the air assist volume by the air assist decreases, the injection is made being shifted toward the exhaust stoke side so as to promote the atomization due to a heat from the intake air pipe, thereby it is possible to aim at enhancing the fuel efficiency and the drivability.

Figure 26:
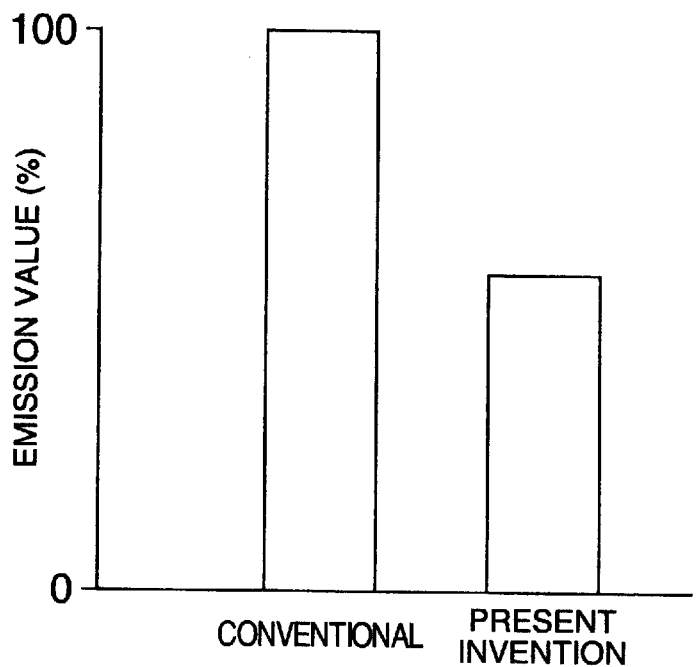
FIG. 26 is a view illustrating result of comparison with conventional one as to emission values value.

FIG. 26 shows results of emission tests in a 10–15 mode. According to the invention it can be reduced by about 40% in comparison with that of a conventional system.

Figure 27:
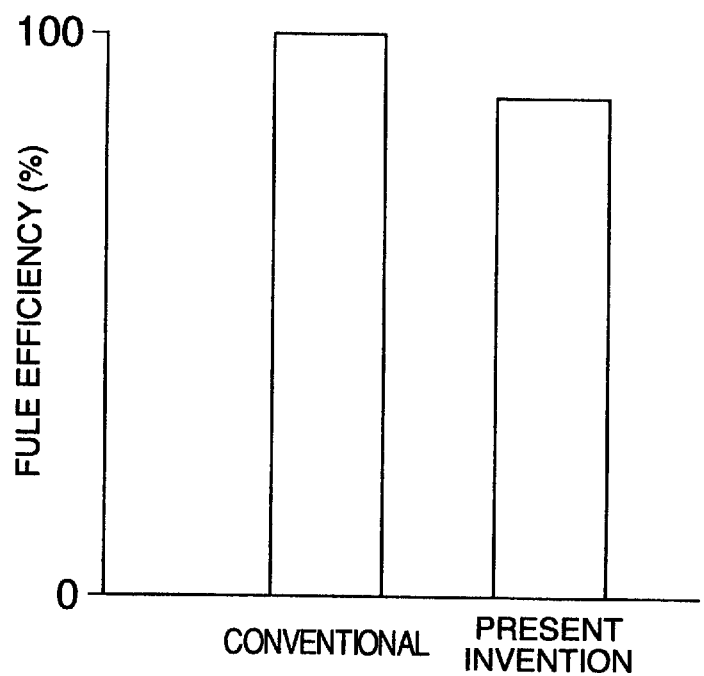
FIG. 27 is a view illustrating result of comparison with conventional one as to fuel efficiency.

Further, FIG. 27 shows results of fuel efficiency tests in the 10–15 mode, and according to the present invention, it can be reduced by about 10% in comparison with that of a conventional system.

With the fuel supply system for a multi-cylinder engine, and the control apparatus therefor, according to the present invention, it is possible to enhance the fuel efficiency, the drivability and the emission characteristic. Further, according to the present invention, the fuel timing is shifted toward the intake stroke side upon air assist, and the fuel injection timing is shifted toward the exhaust stroke side in accordance with an air assist volume, thereby it is possible to aim at enhancing the quality of exhaust gas, the fuel efficiency and the drivability by building up a reasonable system in combination of a droplet size of fuel and an operating condition.

What is claimed is:

1. A fuel supply control apparatus for a multi-cylinder internal combustion engine including a means for detecting an operating condition of the engine which includes an intake air volume of the engine; a control means receiving an output signal from said detecting means, for delivering a fuel injection control signal which sets a supply volume of fuel to be injected into each of a plurality of cylinders of the engine and a fuel injection timing, a fuel injection means for controlling an opening degree thereof in accordance with said fuel injection control signal from said control means, and for injecting the fuel into each of the plurality of the engine; and an air-assist means for causing said fuel injection means to inject a small droplet size of the fuel; characterized by a means for shifting said fuel injection timing from intake-air stroke into exhaust stroke in accordance with a degree of assist by said air-assist means.

2. A fuel supply control apparatus for a multi-cylinder internal combustion engine as set forth in claim 1, characterized in that said fuel injection timing is such that injection is carried out during the intake stroke when said air assist volume is ensured, but said fuel injection timing is shifted from the intake stroke to the exhaust stroke as said degree of assist is decreased.

3. A fuel supply control apparatus for a multi-cylinder internal combustion engine as set forth in claim 1, characterized in that the shifting of said fuel injection timing is made by shifting the timing of initiation of fuel injection.

4. A fuel supply control apparatus for a multi-cylinder internal combustion engine as set forth in claim 1, characterized in that when the supply volume of fuel into each of the cylinders is determined in accordance with said detected engine operating condition, a limit of a position of completion of the fuel injection is determined, and control is made such that the position of completion of said fuel injection timing dose not exceeds the limit of the position of the completion of the fuel injection.

5. A fuel supply control apparatus for a multi-cylinder internal combustion engine as set forth in claim 1, characterized in that the degree of air assist by said air-assist means is detected in accordance with at least any one of a pressure in an intake air pipe of said internal combustion engine, an intake air flow rate, a throttle opening degree and a load value.

* * * * *